UNITED STATES PATENT OFFICE.

CHARLES F. PANKNIN, OF CHARLESTON, SOUTH CAROLINA.

IMPROVEMENT IN INK.

Specification forming part of Letters Patent No. 106,198, dated August 9, 1870.

*To all whom it may concern:*

Be it known that I, CHARLES F. PANKNIN, of the city and county of Charleston, and State of South Carolina, have invented a new and Improved Acid-Resisting Ink; and I do hereby declare that the following is a full, clear, and exact description of the same.

My invention relates to anti-acid inks, or those which cannot be removed from the paper; and consists in an ink formed of logwood extract, chromate of potash, ferro-cyanuret of iron, oxalic acid, indigo, sulphate of potash, and carbolic acid, when prepared and combined as hereinafter specified.

I form three separate and distinct solutions, and then mix them thoroughly together, to produce an improved ink as the resultant.

The first consists of ten ounces of coarsely-powdered extract of logwood, dissolved in two gallons of pure water, stirred frequently for twenty-four hours, and then mixed with one-half an ounce of yellow chromate of potash dissolved in a gallon of pure water. This forms about three gallons of the first solution.

The second consists of five ounces of ferro-cyanuret of iron, two ounces of oxalic acid, and one ounce of prepared ox-gall dissolved in one gallon of pure water.

The third consists of a solution of indigo and sulphate of potash in one gallon of pure water, whose only function is to deepen the color.

These three separate constituents are then thoroughly intermixed and caused to combine uniformly, after which five drams of carbolic acid are added thereto.

I am aware that all black writing-inks (not chemical) have logwood extract or nut-galls as the body or basis of the ink. That made with nut-galls, however, has many disadvantages, which are fully set forth in Muspratt's Chemistry, on page 375, and in other parts. On the other hand, the indelible ink made by Caldwell's patent (which is better known to the public) is objectionable because the alcohol, which forms one of its ingredients, evaporates rapidly on exposure, and leaves the other constituents in a gummy condition. It also has lamp-black as an ingredient, which is not readily held in solution, and requires very thorough shaking before it is used. Instead of the latter, I employ Prussian blue, which is of less specific gravity and of more finely-comminuted particles. The particles are therefore suspended in solution by the slightest agitation.

By dispensing with alcohol and lamp-black entirely, I avoid all tendency to gumminess and thickness, and secure an ink which flows freely from the pen, and can be made at one-half the cost of Caldwell's. However, I do not claim, broadly, the application of any one or two of the ingredients mentioned to the manufacture of ink, but esteem the vital point of my invention to consist in combining the ingredients in such proportions that no two will decompose or neutralize one another.

Having thus described all that is necessary to a clear understanding of my invention, what I esteem as new, and desire to protect by Letters Patent, is—

The improved anti-acid ink above described, formed of the ingredients and in the proportions specified, and brought into combination, as set forth.

CHARLES F. PANKNIN.

Witnesses:
   G. W. DINGLE,
   C. W. STILES.